United States Patent [19]

Vanderpool et al.

[11] Patent Number: 4,718,996

[45] Date of Patent: * Jan. 12, 1988

[54] RECOVERY OF TUNGSTEN, SCANDIUM, IRON, AND MANGANESE VALUES FROM TUNGSTEN BEARING MATERIAL

[75] Inventors: Clarence D. Vanderpool; Martin B. McInnis, both of Towanda; Judith A. Ladd, Sayre, all of Pa.

[73] Assignee: GTE Products Corporation, Stamford, Conn.

[*] Notice: The portion of the term of this patent subsequent to Nov. 25, 2003 has been disclaimed.

[21] Appl. No.: 903,804

[22] Filed: Sep. 4, 1986

Related U.S. Application Data

[63] Continuation-in-part of Ser. No. 821,932, Jan. 24, 1986, Pat. No. 4,624,703.

[51] Int. Cl.[4] .................... C22B 34/36; C22B 59/00
[52] U.S. Cl. ............................ 204/112; 75/2; 75/101 R; 75/101 BE; 75/109; 75/114; 75/115; 75/121; 423/21.5; 423/49; 423/54; 423/55; 423/140; 423/150; 423/263
[58] Field of Search ............... 75/101 R, 101 BE, 2, 75/108, 109, 114, 115, 121; 204/112; 423/2, 9, 21.1, 21.5, 49, 52, 54, 55, 57, 146, 140, 150, 263; 252/631, 634, 635, 18; 376/184, 189, 323

[56] References Cited

U.S. PATENT DOCUMENTS

| | | | |
|---|---|---|---|
| 3,582,290 | 6/1971 | Grinstead | 423/21.1 |
| 4,016,237 | 4/1977 | Mason et al. | 423/21.1 |
| 4,624,703 | 11/1986 | Vanderpool et al. | 423/150 |
| 4,626,280 | 12/1986 | Vanderpool et al. | 423/150 |

Primary Examiner—Robert L. Stoll
Attorney, Agent, or Firm—Donald R. Castle

[57] ABSTRACT

A process is disclosed for recovering tungsten, scandium, iron, and manganese from tungsten bearing material. The process involves digesting the material in sufficient sulfuric acid at a sufficient temperature for a sufficient time in the presence of a reducing agent to form a digestion solution containing the major portion of the scandium, iron, and manganese, and a digestion residue containing the major portion of the tungsten, separating the digestion solution from the digestion residue and extracting essentially all of the scandium from the solution with an organic consisting essentially of an extracting agent which is a dialkyl phosphoric acid which is present in an amount sufficient to extract essentially all of the scandium without extracting appreciable amounts of iron and manganese, and the balance an essentially aromatic solvent. The scandium containing organic is removed from the raffinate and stripped of the scandium with an aqueous ammonium carbonate solution which is separated from the stripped organic. The pH of the raffinate is adjusted to at least about 2 with a base and electrolyzed to remove the major portion of the iron as iron powder, which is separated from the resulting electrolyzed solution which contains the major portion of the manganese.

10 Claims, No Drawings

RECOVERY OF TUNGSTEN, SCANDIUM, IRON, AND MANGANESE VALUES FROM TUNGSTEN BEARING MATERIAL

CROSS-REFERENCE TO RELATED APPLICATION

This application is a continuation-in-part of U.S. Pat. Ser. No. 821,932 filed Jan. 24, 1986 now U.S. Pat. No. 4,624,703 issued Nov. 25, 1986.

BACKGROUND OF THE INVENTION

This invention relates to a process for recovering tungsten and scandium, values from a tungsten bearing material containing scandium, iron and manganese. More particularly, it relates to a process for recovering these values from material resulting from the processing of tungsten ores.

In the processing of tungsten ores such as scheelites, wolframites, hubnerites, or mixtures of the same, typically by digesting in basic medium as sodium hydroxide or sodium carbonate, the calcium, iron, and manganese present in the ores are precipitated or form an insoluble material which is separated from the resulting tungstate solution by filtration. Since the ores vary in composition, this insoluble material can also contain elements such as scandium, arsenic, antimony, niobium, and possibly sulfur and phosphorus. Also, because the digestion of tungsten is usually never complete, the residue contains tungsten.

It would be highly desirable to reclaim the tungsten values and other valuable elements as scandium, iron, and manganese from these residues from both an economic and and environmental standpoint.

SUMMARY OF THE INVENTION

In accordance with one aspect of this invention there is provided a process for recovering tungsten and scandium from tungsten bearing material containing tungsten, scandium, iron and manganese. The process involves digesting the material in an aqueous solution selected from the group consisting of an aqueous solution saturated with sulfur dioxide and sulfuric acid with an additional reducing agent, at a sufficient temperature for a sufficient time to form a digestion solution containing the major portion of the scandium, iron, and manganese, and a digestion residue containing the major portion of the tungsten, separating the digestion solution from the digestion residue and extracting essentially all of the scandium from the solution with an organic consisting essentially of an extracting agent which is a dialkyl phosphoric acid, which is present in an amount sufficient to extract essentially all of the scandium without extracting appreciable amounts of iron and manganese, and the balance an essentially aromatic solvent. The scandium containing organic is removed from the raffinate and stripped of the scandium with an aqueous ammonium carbonate solution which is separated from the stripped organic.

In an additional recovery step which is another aspect of this invention the pH of the raffinate is adjusted to at least about 2 with a base and electrolyzed to remove the major portion of the iron as iron powder, which is separated from the resulting electrolyzed solution which contains the major portion of the manganese.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The starting tungsten bearing material of this invention can be essentially any such material. However, the preferred material is the tungsten, scandium, iron, and manganese containing residue which results in the processing of tungsten ores as scheelites, wolframites, hubnerites, etc., or mixtures thereof by digesting in basic medium as in sodium hydroxide or sodium carbonate.

The typical analysis of such a material is as follows in percent by weight: about 22% Fe, about 18% Mn, about 1.5% W, and about 0.06% Sc.

The tungsten bearing material can be first digested in an aqueous solution saturated with sulfur dioxide at a sufficient temperature for a sufficient time to form a digestion solution containing the major portion of the scandium, iron and manganese and a digestion residue containing the major portion of the tungsten. The solution saturated with sulfur dioxide is generally prepared by forming an aqueous slurry of the material and bubbling sulfur dioxide gas through the slurry. The typical temperatures are from about 80° C. to about 100° C. with from about 90° C. to about 95° C. being preferred. The time is typically about 48 hours.

The tungsten bearing material can also be first digested in sufficient sulfuric acid at a sufficient temperature for a sufficient time in the presence of a reducing agent to form a digestion solution containing essentially all of the scandium, iron, and manganese and a digestion residue containing essentially all of the tungsten.

Sulfuric acid does not produce a toxic material such as chlorine gas which is produced when hydrochloric acid is used as the digesting acid. Also, sulfuric acid is the least expensive acid. For these reasons, it is chosen as the digesting acid.

It is preferred that the tungsten bearing material be added slowing to the sulfuric acid because the material usually forms carbonates during storage.

Digestion temperatures are typically in the range of from about 100° C. to about 140° C. with from about 130° C. to about 140° C. being preferred. The total digestion time is in the range of from about 4 hours to about 7 hours with from about 5 hours to about 7 hours being preferred.

It is preferred that the sulfuric acid concentration be from about 18 normal to about 36 normal. Amounts of sulfuric acid will become apparent in the example.

The reducing agent can be hydrogen peroxide (in acid at a pH of below about 7), sulfur dioxide which can be bubbled into the digestion mixture, or elemental iron. Elemental iron is preferred. Hydrogen peroxide interferes with the precipitation of iron in the subsequent electrolysis step and sulfur dioxide is hazardous to the environment.

The preferred digestion procedure is to first digest the material at from about 100° C. to about 130° for from about 2 hours to about 3 hours to allow the iron in the material to be essentially completely digested to a form which is soluble in the digestion solution. The resulting digestion mixture is then diluted typically to about twice its volume with water. The reducing agent, preferably iron as scrap iron typically in an amount of from about 7 to about 8 grams per 100 grams of starting material is then added. After about 4 hours of continuous agitation at about 100° C., the color of the resulting digestion mixture turns a light tan which indicates the dissolution of the major portion of the manganese in the resulting digestion solution.

The digestion solution is then separated from the digestion residue by any standard method such as filtration.

The digestion residue contains essentially all of the tungsten which was present in the starting material. It can also contain $SiO_2$, $CaSO_4$, and lesser amounts of iron, manganese, and scandium. A typical weight analysis is about 4.5% Fe, about 0.71% Mn, less than about 0.03% Sc, and from about 5 to about 10% W. The tungsten in the residue is now more concentrated than it was in the starting material and can now be processed by standard methods such as caustic digestion to render it in usable form.

The digestion solution contains typically the major portion of the scandium, iron, and manganese which were present in the starting material. A typical analysis of the digestion solution is from about 23 to about 24 g Fe/l, about 16 g Mn/l, from about 0.15 to about 0.23 g W/l, and about 0.04 g Sc/l.

Essentially all of the scandium is extracted from the digestion solution with an organic solution consisting essentially of an extracting agent which is a dialkyl phosphoric acid which is present in an amount sufficient to extract essentially all of the scandium without extracting appreciable amounts of iron and manganese, and the balance an essentially aromatic solvent. The formula of the dialkyl phosphoric acid is:

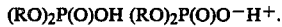

The preferred dialkyl phosphoric acid is di(2-ethylhexyl phosphoric acid, D2EHPA, which is typically supplied by Mobil Corporation. In this case one of the alkyl groups, (R) is 2-ethyl hexyl. Basically the mechanism of extraction involves an exchange of the available hydrogen of the dialkyl phosphoric acid for the scandium which is in the cationic form. The extracting agent is selective for scandium over iron and manganese. The concentration of the dialkyl phosphoric acid is critical because at concentrations above the amount needed to extract the scandium, iron and manganese are extracted along with the scandium resulting in a less efficient separation of scandium from the iron and manganese. Furthermore, presence of excess amounts of iron and manganese in the organic can cause emulsions which make the extraction step inoperable.

The amount of dialkyl phosphoric acid in the organic is therefore governed by the amount of scandium in the digestion solution. The amount of dialkyl phosphoric acid which is to be needed can be determined experimentally by well known methods in solvent extraction technology. In accordance with a preferred emobdiment of this invention, the typical amount of D2EHPA is from about 2% to about 10% by volume to extract the scandium from typical digestion solutions, with about 2% by volume being the especially preferred concentration. More specific values will be apparent in the example.

The preferred essentially aromatic solvent consists essentially of a mixture of alkyl benzenes wherein the alkyl benzenes have molecular weights of 120, 134, or 148 and the total number of carbon atoms in the alkyl chains attached to the benzene ring is either 3, 4 or 5. Typical constituents include trimethyl benzene, ethyl benzene, dimethylethyl benzene, methyl properly benzene, tetramethyl benzene, diethyl toulene, dimethylisopropyl benzene, and the like. This material is sold by Buffalo Solvents and Chemicals Corporation under the trade name of SC#150. In the 1972 edition of "Organic Solvents," a trade publication of Buffalo Solvents and Chemicals Corporation, SC#150 is listed as having a boiling point range of from about 188° C. to about 210° C., a flash point of 151° F., and a specific gravity of about 0.891.

The extraction is carried out by conventional liquid-liquid extraction techniques as by mixing the organic and digestion solution which is referred to as the aqueous in a conventional mixer-settler apparatus or in a separatory funnel for a period of time which depends factors as the volume ratio of the organic and aqueous. The resulting scandium-containing organic phase and aqueous phase which is called the raffinate are then allowed to physically disengage after which they are separated from each other by conventional liquid-liquid separation techniques such as by drawing the aqueous from the bottom of the settler or separatory funnel.

In actual practice, it is preferred to contact successively one or more, and preferably 3 fresh aliquots of the organic solution with the digestion solution to remove essentially all of the scandium from the solution, followed by removing each scandium-containing organic aliquot after contact with the digestion solution. The organic aliquots can than be combined to form 1 scandium-containing organic.

The scandium is then stripped from the scandium-containing organic with an aqueous solution of ammonium carbonate to form a scandium-containing ammonium carbonate solution. The ammonium carbonate stripping solution contains preferably from about 5% to about 10% by weight of ammonium carbonate.

The scandium-containing ammonium carbonate solution is then separated from the resulting stripped organic solution. This can be done by essentially the same technique as described for the extraction step.

In actual practice the same technique can be carried out as for the extraction step. The scandium-containing organic can be contacted successively with fresh aliquots of the stripping solution to insure that essentially all of the scandium is stripped from the organic followed by separation of each aliquot from the organic after each contact. The resulting scandium-containing aliquots of stripping solution can then be combined to form one scandium-containing stripping solution.

The scandium-containing ammonium carbonate solution can now be processed by standard methods to recover the scandium. This can be done by evaporation of the solution to dryness followed by heating the resulting solid to about 400° C. to drive off the ammonium carbonate. The residue typically contains by weight from about 0.5% to about 10% Sc, from about 1% to about 10% Mn, and from about 1% to about 10% Fe. The residue can then be processed by standard methods to render the scandium is usable form. For example, the residue can be upgraded for use in lasers and other electronic applications.

The raffinate from the scandium extraction is processed to recover the iron and manganese. This is done by first adjusting the pH of the raffinate to at least about 2, and preferably from about 2.5 to about 3.0 with a base which is preferably ammonium hydroxide. The pH adjusted raffinate is then subjected to an electric current for a sufficient time to electrolyze it an form iron powder containing the major portion of the iron which was in the raffinate and an electrolyzed solution containing the major portion of the manganese. The preferred electrolyzing conditions are from about 12 to about 24 amps at about 6 to about 12 volts for from about 10 to about 12 hours.

Essentially all of the iron is converted to iron powder which can be used as is, for example to make pressed parts.

The iron is then removed from the electrolyzed solution by standard techniques such as filtration.

The electrolyzed solution is then processed by standard methods to recover the manganese. One method is by adjusting the pH to from about 9.0 to about 9.5 with ammonium hydroxide and bubbling air into the solution for about 4 hours. The manganese precipitates as $Mn_3O_4$ and $Mn_2O_3$.

One example of the use of $Mn_3O_4$ and $Mn_2O_3$ is in combination with iron to produce ferro manganese for the steel industry.

To more fully illustrate this invention, the following non-limiting example is presented.

EXAMPLE

About 100 g of dry tungsten bearing material containing in percent by weight about 22% Fe, about 18% Mn, about 1.5% W, and about 0.06% Sc is added slowly to about 300 cc of about 18N $H_2SO_4$. The resulting slurry is digested at about 140° C. for about 2 to 4 hours to digest the iron. The slurry is then diluted to about twice its volume with water and about 8 grams of scrap iron is added. After about 4 more hours of continued agitation at about 100° C., the color of the slurry changes to a light tan which indicates the dissolution of the major portion of the manganese. The resulting digestion mixture is filtered. The insolubles contain in percent by weight about 4.5% Fe, about 0.71% Mn, less than about 0.03% Sc, about 5–10% W, and some $SiO_2$, and $CaSO_4$. The resulting filtrate contains Fe, Mn, and Sc.

The filtrate is contacted three times with a 2% by volume solution of D2EHPA in SC#150 to extract the scandium. The organic (about 100 cc) is then stripped three times with about 33 cc aliquots of a 10% weight solution of ammonium carbonate in water to remove the scandium. The resulting combined ammonium carbonate strip solution is then evaporated to dryness and then heated to about 400° C. to drive off the ammonium carbonate. The brownish residue contains in percent by weight from about 1 to about 10% by weight Sc, from about 1% to about 10% Fe, and from about 1% to about 10% Mn.

The raffinate from the extraction of Sc is adjusted to a pH of from about 2.5 to about 2.8 with ammonium hydroxide and then electrolyzed at about 6 to 12 volts with from about 12 to 24 amps. About 16 to 24 hours are required under these conditions to remove essentially all of the Fe from the raffinate.

The iron is then separated from the resulting electrolyzed solution by filtration and the electrolyzed solution is then made basic with ammonium hydroxide to a pH of from about 9.0 to about 9.5 and air is bubbled into it for about 4 hours. The manganese is precipitated as $Mn_3O_4$ and $Mn_2O_3$.

While there has been shown and described what are at present considered the preferred embodiments of the invention, it will be obvious to those skilled in the art that various changes and modifications may be made therein without departing from the scope of the invention as defined by the appended claims.

What is claimed:

1. A process for recovering tungsten and scandium from a material containing tungsten, scandium, iron and manganese, said process comprising:
   (a) digesting said material in an aqueous solution selected from the group consisting of an aqueous solution saturated with sulfur dioxide and sulfuric acid in the presence of a reducing agent at a sufficient temperature and for a sufficient time to form a digestion solution containing the major portion of said scandium, iron, and manganese, and a digestion residue containing the major portion of said tungsten;
   (b) separating said digestion solution from said digestion residue;
   (c) extracting essentially all of said scandium from said digestion solution with an organic solution consisting essentially of an extracting agent which is a dialkyl phosphoric acid which is present in an amount sufficient to extract essentially all of the scandium without extracting iron and manganese, and the balance an essentially aromatic solvent;
   (d) separating the resulting scandium-containing organic from the resulting raffinate;
   (e) stripping the scandium from the scandium-containing organic with an aqueous solution of ammonium carbonate to form a scandium-containing ammonium carbonate solution;
   (f) separating said scandium-containing ammonium carbonate from the resulting stripped organic solution.

2. A process of claim 1 in which the aqueous solution is sulfuric acid of a concentration of from about 18 normal to about 36 normal.

3. A process of claim 1 wherein said tungsten bearing material is digested in sulfuric acid at from about 100° C. to about 140° C. for from about 4 hours to about 7 hours.

4. A process of claim 1 wherein said reducing agent is iron.

5. A process of claim 1 wherein the extracting agent is di(2-ethylhexyl) phosphoric acid.

6. A process of claim 5 wherein said aromatic solvent consists essentially of a mixture of alkyl benzenes wherein the alkyl benzenes have molecular weights of 120, 134, or 148 and the total number of carbon atoms in the alkyl chains attached to the benzene ring are either 3, 4, or 5.

7. A process according to claim 1 containing the following additional steps:
   (a) adjusting the pH of said raffinate to at least about 2 with a base;
   (b) subjecting the resulting pH adjusted raffinate to an electric current for a sufficient time to electrolyze said raffinate and form iron powder containing the major portion of the iron which was in said raffinate and an electrolyzed solution containing the major portion of the manganese; and
   (c) separating said iron powder from said electrolyzed solution.

8. A process of claim 7 wherein said raffinate is adjusted to a pH of from about 2.5 to about 3.0.

9. A process of claim 8 wherein the pH is adjusted with ammonium hydroxide.

10. A process of claim 10 wherein said raffinated is subjected to an electric current of from about 12 to about 24 ampheres at from about 6 to about 12 volts for about 10 to about 24 hours.

* * * * *